(12) United States Patent
Wu et al.

(10) Patent No.: US 10,823,155 B2
(45) Date of Patent: Nov. 3, 2020

(54) BEARING SUPPORTING APPARATUS FOR WIND TURBINE GENERATOR SYSTEM, INSTALLING METHOD, AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Qinghu Wu, Beijing (CN); Yun Peng, Beijing (CN); Hongkui Shi, Beijing (CN)

(73) Assignee: Beijing Goldwind Science & Creation Windpower Equipment Co., Ltd., Beijing (CN)

( * ) Notice: Subject to any disclaimer, the term of this patent is extended or adjusted under 35 U.S.C. 154(b) by 80 days.

(21) Appl. No.: 15/567,440

(22) PCT Filed: Sep. 23, 2016

(86) PCT No.: PCT/CN2016/099872
§ 371 (c)(1),
(2) Date: Jun. 4, 2018

(87) PCT Pub. No.: WO2017/054679
PCT Pub. Date: Apr. 6, 2017

(65) Prior Publication Data
US 2018/0266399 A1    Sep. 20, 2018

(30) Foreign Application Priority Data
Sep. 29, 2015  (CN) .......................... 2015 1 0634020

(51) Int. Cl.
*F03D 80/70* (2016.01)
*F03D 1/06* (2006.01)

(52) U.S. Cl.
CPC ............... *F03D 80/70* (2016.05); *F03D 1/06* (2013.01); *F03D 1/0691* (2013.01);
(Continued)

(58) Field of Classification Search
CPC .......... F03D 80/70; F03D 1/0691; F03D 1/06; F05B 2230/60; F05B 2240/50;
(Continued)

(56) References Cited

U.S. PATENT DOCUMENTS

| 7,866,894 B2 | 1/2011 | Hewitt |
| 2012/0141201 A1* | 6/2012 | Anderson, III ......... F16D 1/094 403/374.4 |

(Continued)

FOREIGN PATENT DOCUMENTS

| CN | 201972854 U | 9/2011 |
| CN | 102630280 A | 8/2012 |

(Continued)

OTHER PUBLICATIONS

Extended European Search Report issued in counterpart European Patent Application No. 16850303.5, dated Jan. 18, 2019.
(Continued)

*Primary Examiner* — Daniel J Wiley
(74) *Attorney, Agent, or Firm* — Finnegan, Henderson, Farabow, Garrett & Dunner LLP (57) ABSTRACT

A bearing supporting apparatus for a wind turbine generator system, where the wind turbine generator system comprises an impeller and a generator, a hub of the impeller is arranged on an outer side of a main bearing seat of the generator, the bearing supporting apparatus for the wind turbine generator system including: at least one locking connector, wherein the locking connector has a locking wedge arranged between the main bearing seat and the hub. The hoisting difficulty may be lowered by using the bearing supporting apparatus for the wind turbine generator system.

11 Claims, 6 Drawing Sheets

(52) U.S. Cl.
CPC ....... *F05B 2230/60* (2013.01); *F05B 2240/50* (2013.01); *Y02E 10/721* (2013.01); *Y02E 10/722* (2013.01); *Y02E 10/725* (2013.01); *Y02P 70/523* (2015.11)

(58) Field of Classification Search
CPC ......... Y10T 29/49945; Y10T 29/49947; Y10T 29/49316; Y10T 29/49696; F16D 1/05; F16D 1/093–096; F16L 21/007; F16L 21/08
USPC ......... 403/368; 29/525, 525.01, 889, 898.07, 29/898.01
See application file for complete search history.

(56) References Cited

U.S. PATENT DOCUMENTS

| | | |
|---|---|---|
| 2012/0237152 A1 | 9/2012 | Wheals |
| 2015/0030277 A1 | 1/2015 | Pick et al. |

FOREIGN PATENT DOCUMENTS

| | | |
|---|---|---|
| CN | 103026061 A | 4/2013 |
| CN | 204300057 U | 4/2015 |
| CN | 105201754 A | 12/2015 |
| EP | 1999839 A1 | 12/2008 |
| EP | 1394406 B1 | 12/2014 |
| EP | 2821635 A1 | 1/2015 |
| JP | 2008-542650 A | 11/2008 |
| JP | 2013-504727 A | 2/2013 |
| JP | 2015-227651 A | 12/2015 |
| KR | 10-2013-0019158 | 2/2013 |
| WO | WO 2007/111425 A1 | 10/2007 |
| WO | WO 2012/080350 A1 | 6/2012 |

OTHER PUBLICATIONS

International Search Report issued by the State Intellectual Property Office of People's Republic of China for International Application No. PCT/CN2016/099872, dated Nov. 25, 2016.
Australian Office Action issued in Australian Application No. 2016333250, dated Oct. 25, 2018.

* cited by examiner

BEARING SUPPORTING APPARATUS FOR WIND TURBINE GENERATOR SYSTEM, INSTALLING METHOD, AND WIND TURBINE GENERATOR SYSTEM

CROSS-REFERENCE TO RELATED PATENT APPLICATIONS

This application is a national stage of International Application No. PCT/CN2016/099872, filed on Sep. 23, 2016, which claims priority to Chinese Patent Application No. 201510634020.9, filed with the Chinese Intellectual Property Office on Sep. 29, 2015 and entitled "Bearing supporting apparatus for wind turbine generator system, installing method, and wind turbine generator system". The disclosure of the above patent application is incorporated herein by reference in its entirety.

TECHNICAL FIELD

The present application relates to the technical field of wind turbine generators, and in particular, to a bearing supporting apparatus for a wind turbine generator system, an installation method, and a wind turbine generator system.

BACKGROUND

Figure 1:
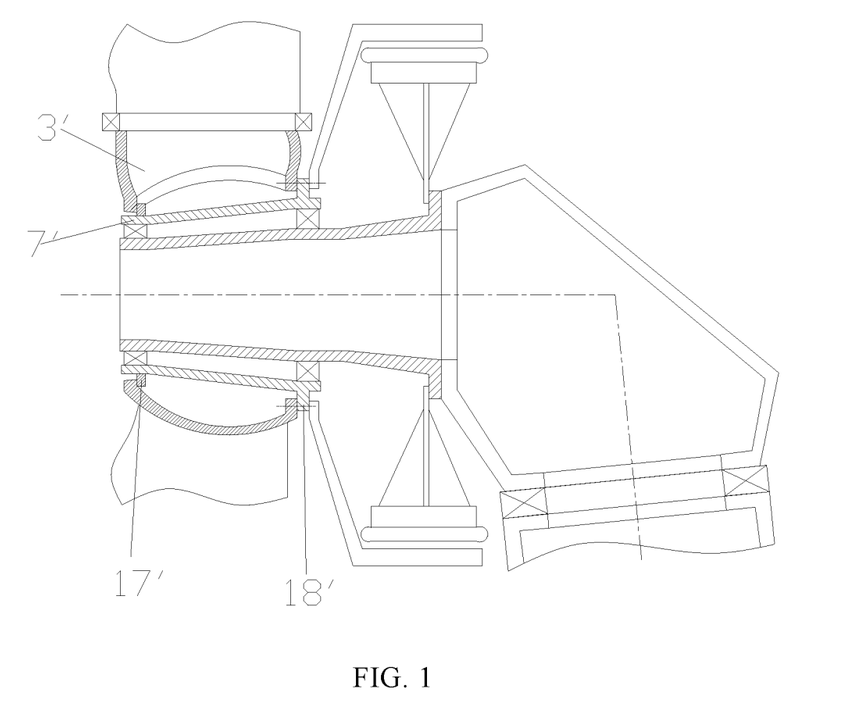
FIG. 1 is a schematic structural diagram of an impeller of a wind turbine generator system matching with a bearing seat in prior art.

As shown in FIG. 1, a direct-drive wind turbine generator system is generally composed of an impeller, a generator, a nacelle mainframe, a tower and etc. Where the generator is arranged on the nacelle mainframe, and the impeller is arranged on a main shaft by a main bearing, and the main shaft is connected with the generator. The impeller is typically composed of a hub 3', a plurality of blades arranged on the hub 3', a corresponding pitch control system, an air deflector and etc. When being assembled, the hub 3' of the impeller is connected with a bearing bracket 7' of the main shaft.

When the wind turbine generator system works, the impeller is driven to rotate by the wind, thereby driving the rotor of the generator to rotate, and enabling a conversion of wind energy to electric energy. During this process, the main bearing bears aerodynamic loads and weight loads of the rotating part of the whole wind generator, meanwhile, the main bearing passes the loads carried thereon to the tower through the nacelle mainframe.

With the increase of a diameter of the impeller and a rated power of the modern wind turbine generator system, requirements on a bearing capacity and a size of the main bearing also rise constantly. In order to meet the design requirements of the wind turbine generator system, improvements on the main bearing of the wind turbine generator system is usually performed in following two aspects:

First, using a single large bearing as the main bearing, in this way, manufacturing costs of bearings are very expensive, and it is also difficult to manufacture.

Second, choosing two or more relatively small bearings as the main bearing. When using two bearings, distributing the two bearings on both sides of the geometric center of the impeller, the loads transferred from the impeller are evenly shared between the two bearings, so that the size and the capacity of the bearing can be controlled in a reasonable range. However, in this way, hoisting costs of the wind turbine generator system are relatively high. This is because multiple flange surfaces between the hub 3' and the bearing bracket 7' need to be butted when hoisting (the flange 17' and the flange 18' in FIG. 1 need to be butted with the flange face on the hub 3' at the same time), which renders the hoisting more difficult.

In addition, as the diameter of the impeller increases, when hoisting the wind turbine generator, the instantaneous wind load leads to an increase in the momentum of the impeller, which renders it more difficult to align multiple flanges simultaneously. If the impeller and the support seat of the main bearing are assembled on the ground before being lifted, then a large lifting capacity of the crane is required, thereby making the cost of hoisting increase dramatically.

SUMMARY

In view of defects in prior art, the present application provides a bearing supporting apparatus for a wind turbine generator system, an installing method and a wind turbine generator system, so as to solve the problem in the prior art that it is difficult to hoist bearings of a wind turbine generator.

A first aspect of the present invention provides a bearing supporting apparatus for a wind turbine generator system, where the wind turbine generator system includes an impeller and a generator, a hub of the impeller is arranged on an outer side of a main bearing seat of the generator, the bearing supporting apparatus for the wind turbine generator system including:

at least one locking connector, where the locking connector has a locking wedge arranged between the main bearing seat and the hub.

A second aspect of the present invention provides a method for installing a bearing supporting apparatus for a wind turbine generator system, the wind turbine generator including an impeller and a generator, where the method includes the following steps:

hoisting a hub of the impeller and sleeving the hub on an outer side of a main bearing seat of the generator;

mounting the locking connector between the main bearing seat and the hub.

A third aspect of the present invention provides a wind turbine generator system comprising a bearing supporting apparatus, where the bearing supporting apparatus is the aforementioned bearing supporting apparatus.

The bearing supporting apparatus for the wind turbine generator system according to the present application, through arranging a locking wedge between a hub and a main bearing seat, the main bearing seat and the hub are fixedly connected and adjustable, thus preventing the need for a plurality of flange surfaces to be aligned between the hub and the main bearing seat when hoisting, thereby reducing the difficulty of hoisting.

DESCRIPTION OF EMBODIMENTS

In order to make the technical solutions of the embodiments of the present invention more comprehensible. The technical solutions in some embodiments of the present invention are hereinafter described in detail with reference to the accompanying drawings. In the case without conflicting, the following embodiments and the feature in the following embodiments can be mutually combined.

The wind turbine generator of the present application adopts a wind turbine generator of a direct-drive type. The method for installing the wind turbine generator system is especially suitable for hoisting the wind turbine generator of the direct-drive type.

Figure 2:
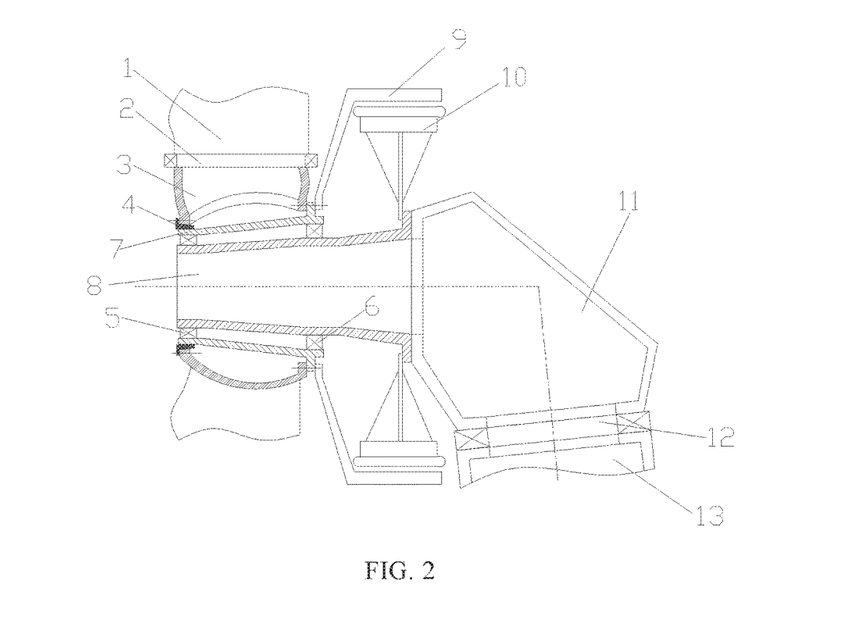
FIG. 2 is a schematic structural diagram of a wind turbine generator system according to an embodiment of the present invention.

As shown in FIG. 2, according to an embodiment of the present invention, a wind turbine generator system mainly includes four portions: an impeller, a generator, a nacelle mainframe 11 and a tower 13.

Where, the tower 13 mainly plays the role of load bearing and is configured to bear other components. The nacelle mainframe 11 is arranged on the tower 13, and is configured for mounting the generator, the control component and etc. The yaw bearing 12 arranged on the nacelle mainframe 11 is configured to adjust an angle of wind for the nacelle mainframe 11 with respect to the tower 13.

The generator is arranged on the nacelle mainframe 11, and the main function of the generator is to convert mechanical energy into electrical energy. The generator includes a main shaft 8, a stator 10 fixedly connected to the main shaft 8, a rotor 9, a first main bearing 5 and a second main bearing 6 sleeved on the main shaft 8 (an inner ring of the first main bearing 5 and the second main bearing 6 is usually in interference fit with the main shaft 8), a main bearing seat 7 sleeved on the outside of the first main bearing 5 and the second main bearing 6 (the outer rings of the first main bearing 5 and the second main bearing 6 are in interference fit or in transition fit with the main bearing seat 7). The generator further includes a generator rotor 9 fixedly connected to the main bearing seat 7.

The impeller is arranged on the main bearing seat 7, and the main function of the impeller is to convert wind energy into mechanical energy. The impeller includes a hub 3, at least one pitch bearing 2 and at least one blade 1, where the blade 1 is arranged on the hub 3 through the pitch bearing 2. The hub 3 is fixedly sleeved on the main bearing seat 7.

After the impeller is installed on the main bearing seat 7, the first main bearing 5 and the second main bearing 6 are respectively arranged on both sides of the center of the hub 3 of the impeller to share load and to balance evenly the force between the both. A relatively small main bearing may be chosen since the load is shared between the two main bearings, thus reducing manufacturing costs of the wind turbine generator.

In the wind turbine generator, the first main bearing 5 and the second main bearing 6 support the hub 3 of the impeller and the main bearing seat 7.

In the present embodiment, the bearing supporting apparatus for the wind turbine generator system includes: at least one locking connector 4 arranged between the hub 3 and the main bearing seat 7. The locking connector 4 is fixedly connected with the hub 3 or the main bearing seat 7, and has a locking wedge 41 arranged between the main bearing seat 7 and the hub 3. The longitudinal-section shape of the locking wedge 41 is of a wedge shape (a longitudinal-section is a section including an axis of the hub 3), namely, a thickness of the locking wedge 41 gradually increases or decreases along the axial direction of the hub 3.

Since the thickness of the locking wedge 41 gradually changes to form a cone surface, thus the locking wedge 41 is arranged between the main bearing bracket 7 and the hub 3, thereby realizing a fixing connection between the main bearing seat 7 and the hub 3. And by way of connecting with the locking wedge 41, providing the matching of the hub 3 and the main bearing seat 7 with a certain level of adjustments in an axial direction and in a radial direction, thereby reducing the difficulty in hoisting the wind turbine generator system with a double bearings arrangement, and reducing a requirement for a position accuracy in assembling the main bearing seat 7 and the hub 3. Thus it is not necessary to simultaneously butt a plurality of flange surfaces when hoisting, thereby reducing the difficulty and costs of hoisting.

In the present embodiment, the locking connector 4 is fixedly connected with the hub 3 so as to realize the fixing of the locking connector 4. In other embodiments, of course, the locking connector 4 may be configured to be connected with the main bearing seat 7.

Figure 3:
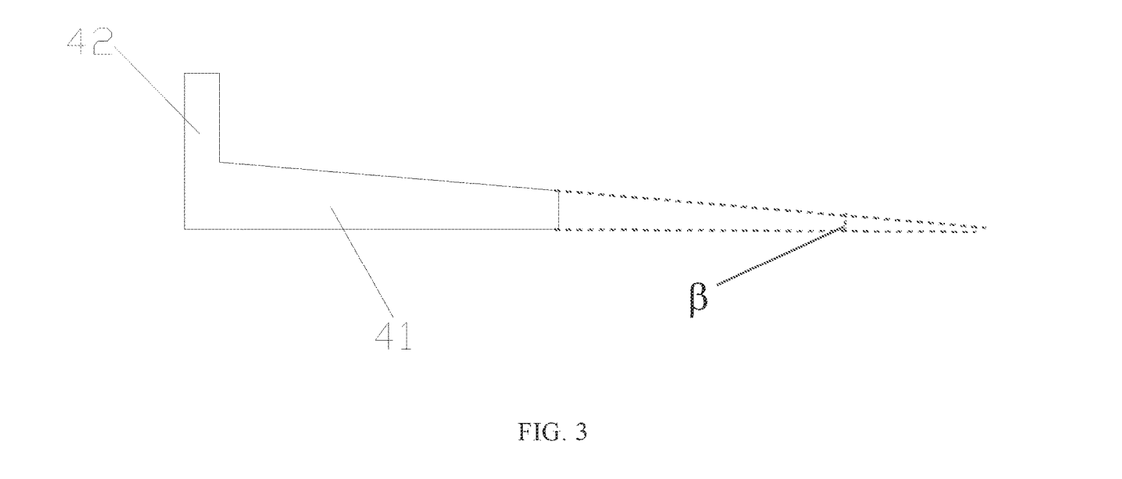
FIG. 3 is a sectional view of a first locking connector of a wind turbine generator system according to an embodiment of the present invention.

As shown in FIG. 3, in the present embodiment, the locking wedge 41 has an inner wall face matching with the main bearing seat 7 and an outer wall surface matching with the hub 3. The inner wall surface of the locking wedge 41 is a cylindrical surface whose generatrix is a straight line parallel to the axis of the main bearing seat 7 (accordingly, the wall surface of the matching part of the main bearing seat 7 and the locking wedge 41 is also a cylindrical surface). The outer wall surface of the locking wedge 41 is a cone surface (accordingly, the wall surface of the matching part of the hub 3 and the locking wedge 41 is also a cone surface).

There is an angle β between the outer wall surface and the inner wall surface of the locking wedge 41. In order to ensure that the locking wedge 41 can be self-locking between the main bearing seat 7 and the hub 3, the angle β should satisfy: the angle β<arctan μ (where, μ is a friction coefficient between the locking wedge 41 and the hub 3). Preferably, the angle β is in the range of 1 degree to 15 degrees. More preferably, the angle β is one of 1 degree, 3 degrees, 8 degrees, 11 degrees, or 15 degrees. At these angles, the force of the locking wedge 41 is more reasonable.

Figure 4:
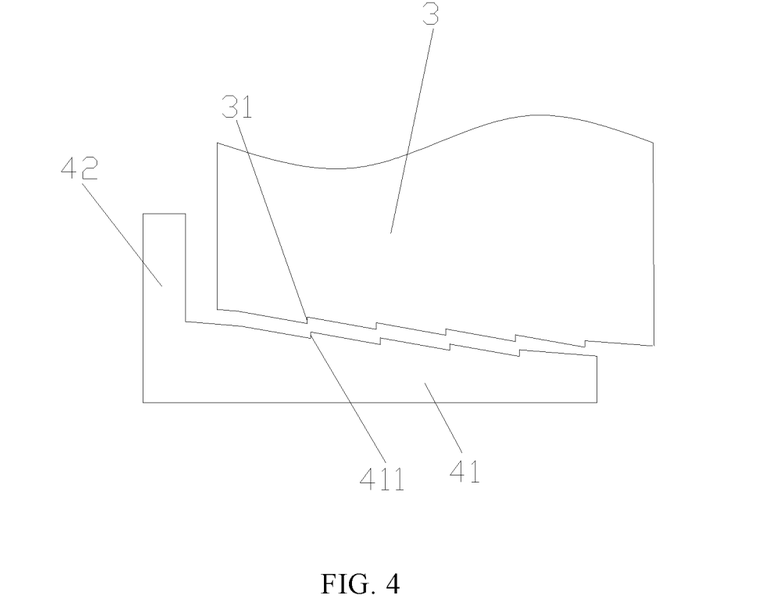
FIG. 4 a schematic view of a second locking connector of a wind turbine generator system matching with a hub according to an embodiment of the present invention.

As shown in FIG. 4, in order to further improve the reliability of the locking wedge 41 and the hub 3, the locking wedge 41 not only has a conical degree, but also has a first protrusion 411 on the outer wall surface thereof. A surface of the hub 3 which is to be matched with the locking wedge 41 has a second protrusion 31, and the first protrusion 411 is matched with the second protrusion 31. In this way, the first protrusion 411 and the second protrusion 31 form a mutually matched saw-tooth shape to limit the position of the locking connector 4 to prevent the movement thereof, thus achieving firmer locking between the locking connector 4 and the hub 3.

Preferably, in order to ensure that the locking connector 4 can be reliably fixed between hub 3 and the main bearing seat 7, the locking connector 4 has a mounting flange 42 which is configured to be fixedly connected with the hub 3, where the mounting flange 42 is fixedly connected at one end of the locking wedge 41 with a greater thickness.

Figure 5:
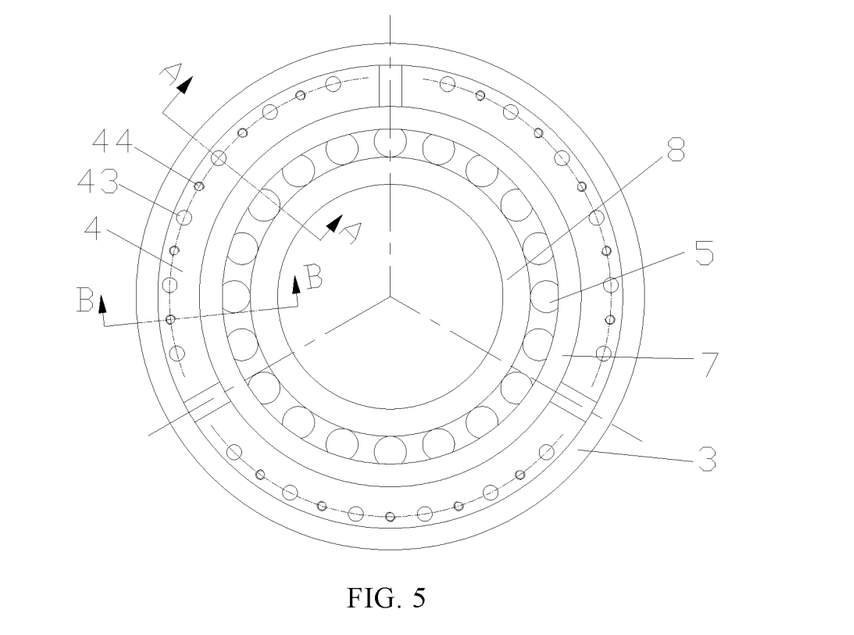
FIG. 5 is a left view of the wind turbine generator system in FIG. 2 without the blade and the pitch bearing.
Figure 6:
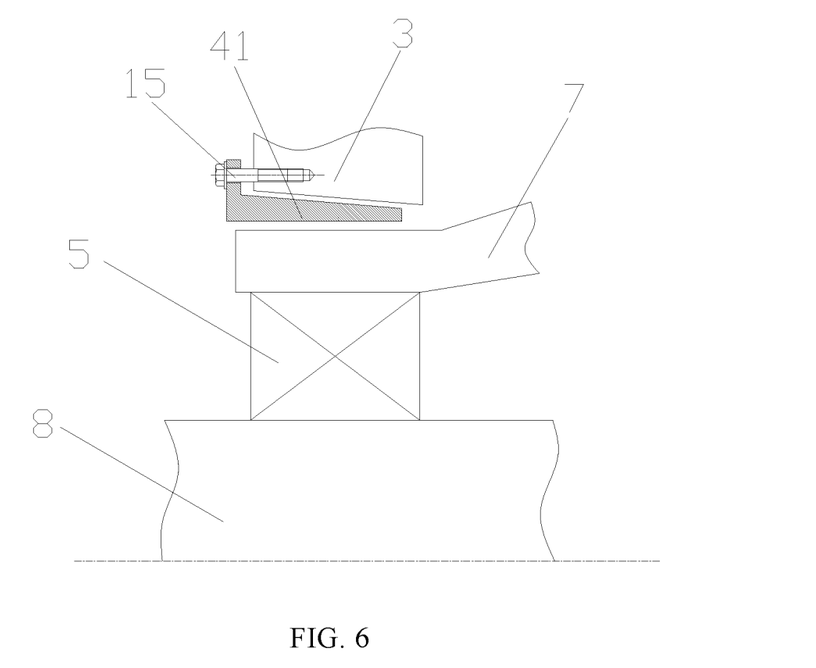
FIG. 6 is a section view of FIG. 5 in the A-A direction.

As shown in FIGS. 5 and 6, in the present embodiment, in order to reliably fix the locking connector 4, the mounting flange 42 has a fixing through hole 43. The bearing supporting apparatus for the wind turbine generator system further includes a fastener 15, the fastener 15 is inserted through the fixing through hole 43 and fixedly connected to the hub 3.

In particular, the fastener 15 is a fixing screw which passes through the fixing through hole 43 and connects with the flange thread of the hub 3, thus achieving a fixation.

Figure 7:
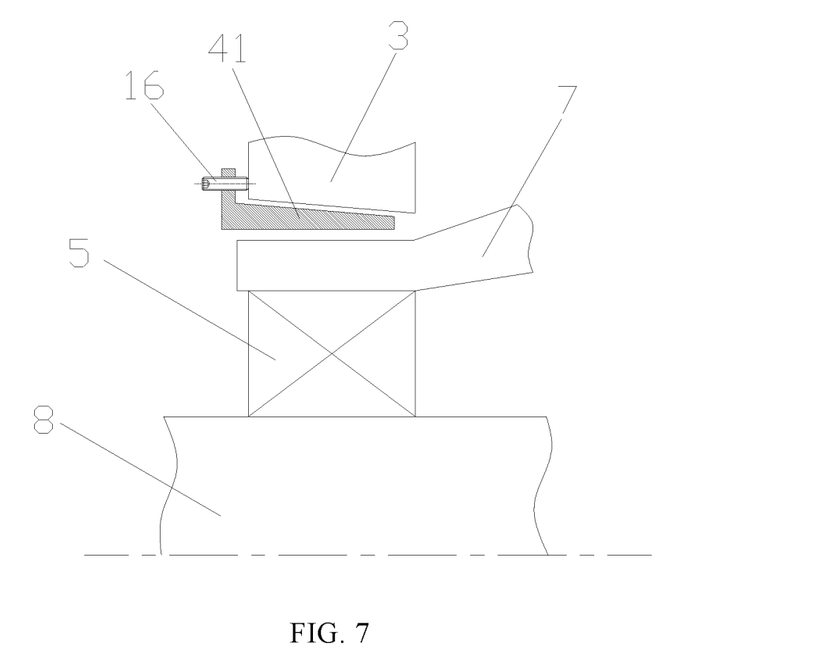
FIG. 7 is a section view of FIG. 5 in the B-B direction.

As shown in FIG. 7, in order that the locking connector 4 may be conveniently removed when the locking connector 4 is replaced or the position of the locking connector 4 needs to be adjusted, the mounting flange 42 has an adjusting threaded hole 44 (see FIG. 5). The bearing supporting apparatus for the wind turbine generator system further includes an ejector piece 16 screwed on the adjusting threaded hole 44, and one end of the ejector piece 16 is propped against an end face of the hub 3. Thus, as long as the piece 16 is unscrewed, the locking connector 4 may be taken out as needed.

The ejector piece 16 may be a screw rod, for the convenience to screw, a groove or a blind hole may be processed on the ejector piece 16, so as to facilitate the insertion of a force-supplying component (a screwdriver, a booster wrench and etc.) into the groove or the blind hole.

During a working process, since the load of the wind turbine generator system is complicated, rigid requirements vary among each part of the main bearing seat 7 in the circumferential direction. In order to meet this requirement, there may be a plurality of the locking connectors 4 distributed on an outer periphery of the main bearing seat 7. According to different rigid demands, the position and number of the locking connectors 4 may be adjusted, enabling the main bearing bracket 7 to have different rigidities at different positions, thus satisfying the requirement of the main bearing, thereby improving the performance of the main bearing.

Figure 8:
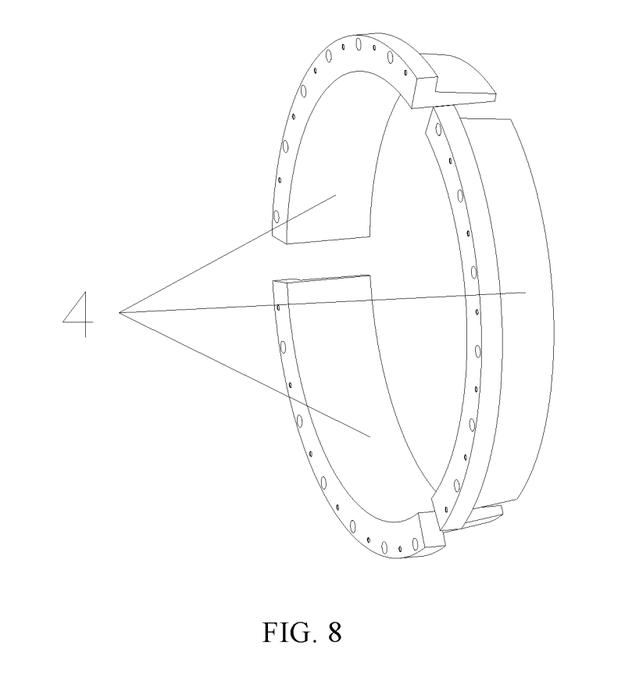
FIG. 8 is a solid schematic structural diagram of a first arrangement manner of a first locking connector of a wind turbine generator system according to an embodiment of the present invention.

As shown in FIG. 8, the bearing supporting apparatus for the wind turbine generator system may have three locking connectors 4 with equal lengths in the circumferential direction, the three locking connectors 4 are evenly distributed on an outer periphery of the main bearing seat 7, thereby rendering the rigidity of the main bearing seat 7 even, which is applicable in a working scenario where the load is evenly distributed.

Figure 9:
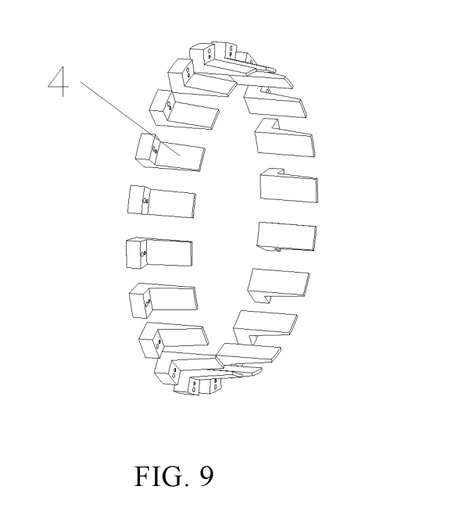
FIG. 9 is a solid schematic structural diagram of a second arrangement manner of a first locking connector of a wind turbine generator system according to an embodiment of the present invention.

As shown in FIG. 9, there is a plurality of the locking connectors 4 (more than three), which are evenly distributed on the outer periphery of the main bearing seat 7. This setting manner is due to the large number of locking connectors 4, when a locking connector 4 is broken, the locking connector 4 can be replaced separately, thereby reducing the replacement cost of the locking connectors 4.

Figure 10:
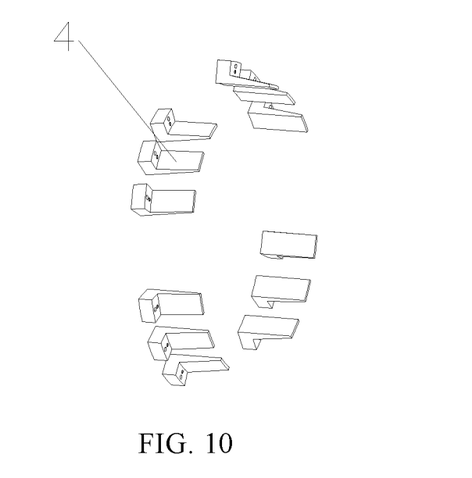
FIG. 10 is a solid schematic structural diagram of a third arrangement manner of a first locking connector of a wind turbine generator system according to an embodiment of the present invention.

As shown in FIG. 10, the bearing supporting apparatus for the wind turbine generator system further includes a plurality of locking and connecting sets. In the bearing supporting apparatus for the wind turbine generator system, each locking and connecting set includes a plurality of small locking connectors 4 which are spaced apart in turn. The locking and connecting sets may be separated from each other by even spaces or uneven spaces in the circumferential direction of the main bearing seat 7. In the setting manner, the locking connectors 4 may be unevenly distributed. For example, a locking connector 4 is arranged at the position of the main bearing seat 7 where a higher rigidity is required, and the locking connector 4 may not be arranged at the position of the main bearing seat 7 where a lower rigidity is required. Or comparing with the position of the main bearing seat 7 where the lower rigidity is required, the number of the locking connectors 4 is greater at the position where the higher rigidity is required.

In addition, the bearing supporting apparatus for the wind turbine generator system may be arranged as a whole, namely, forming a whole annular locking connector 4 (not shown) along an outer ring of the bearing seat thereof, thus improving an assembling efficiency.

According to another aspect of the present invention, a method for installing a bearing supporting apparatus for a wind turbine generator system is provided, which includes the following steps:

hoisting a hub 3 of an impeller and sleeving the hub 3 on an outside of a main bearing seat 7;

mounting the aforementioned locking connector 4 between the main bearing seat and the hub 3 and fixing the main bearing seat 7 and the hub 3. The number of flanges to be aligned may be reduced with the arrangement of the locking connector 4, thereby improving a speed for butting the flanges and reducing costs of hoisting.

Figure 11:
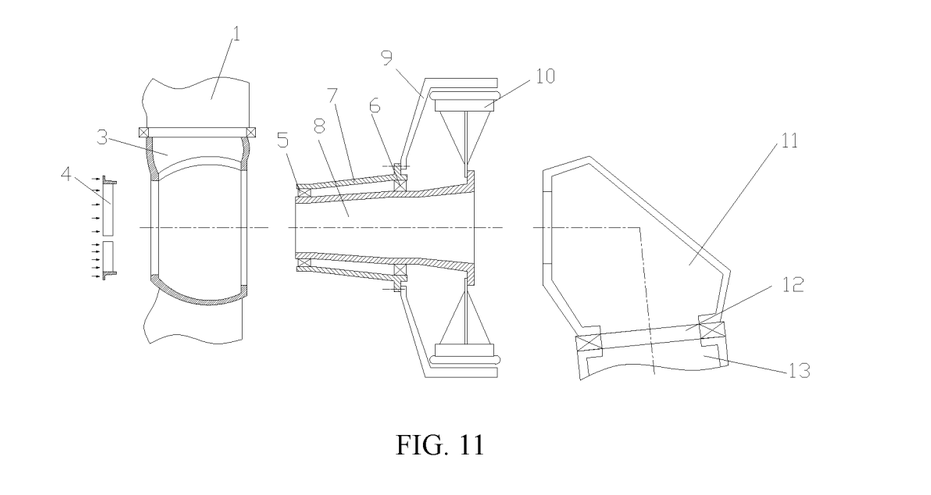
FIG. 11 is a structural explosion diagram of a wind turbine generator system according to an embodiment of the present invention.

Specifically, when hoisting the entire wind turbine generator system, as shown in FIG. 11, firstly, hoisting the nacelle mainframe 11 onto the tower 13, where the nacelle mainframe 11 and the flange on the tower 13 are aligned. Then, the generator is fitted onto the nacelle mainframe 11, where the main shaft 8 of the generator and the flange on the nacelle mainframe 11 are aligned. After that, the impeller is fastened on the main bearing seat 7 of the generator with a round of flange bolts. At this time, the rear side of the hub 3 of the impeller and the flange on the main bearing seat 7 are aligned. Finally, mounting the locking connector 4 between the hub 3 and the main bearing seat 7 and fixing the locking connector 4 on the hub 3 via a fastener 15. From the foregoing process, it can be seen that in each step of the hoisting process, only one flange is aligned, thus reducing the difficulty of hoisting, thereby reducing the cost of hoisting the wind turbine generator.

In accordance with another aspect of the present invention, a wind turbine generator system is provided, which includes: a bearing supporting apparatus, and the bearing supporting apparatus is the foregoing bearing supporting apparatus. The difficulty in hoisting the wind turbine generator system using the bearing supporting apparatus may be lower.

The present application relates to a bearing supporting apparatus for a wind turbine generator system, an installing method and a wind turbine generator system, which gives rise to the following effects:

by arranging the locking connector with a taper between the hub and the main bearing seat, the axial fixing and radial fixing of the main bearing seat may be satisfied on the basis of bringing no obvious increase to costs of manufacturing and hoisting.

At the same time, the number and the position of the locking connectors may be adjusted according to actual requirements, so as to make the main bearing seat reach the proper rigidity required for the design, thereby providing the two main bearings of the wind turbine generator system with better performance.

In addition, the adjustable fixation of the main bearing seat avoids the hoisting difficulty caused by simultaneous alignments of multiple flanges, thereby reducing the hoisting cost, rendering a dual bearing solution with lower cost and arranged at both front and rear sides of the hub economical and feasible.

These are only embodiments of the present invention; but not intended to limit the scope of the present invention. The equivalent structure or equivalent process transformation which is made by using the description and the accompanying drawings of the present invention and is directly or indirectly applied to other related technical areas, are all equally included in the patent protection scope of the present invention.

Finally, it should be noted that the foregoing embodiments are merely intended to describe the technical solutions of the present invention other than limit the present invention. Although the present invention is described in detail with reference to the foregoing embodiments, a person of ordinary skill in the art should understand that he may still make modifications to the technical solutions described in the foregoing embodiments, or make equivalent replacements to some or all technical features thereof, and such modification and replacement cannot make the essence of the corresponding technical solutions depart from the scope of the technical solutions of the embodiments of the present invention.

What is claimed is:

1. A bearing supporting apparatus for a wind turbine generator system, wherein the wind turbine generator system comprises an impeller and a generator, a hub of the impeller is arranged on an outer side of a main bearing seat of the generator, the bearing supporting apparatus for the wind turbine generator system comprising:
    at least one locking connector, wherein the locking connector has a locking wedge arranged between the main bearing seat and the hub;
    wherein a longitudinal-section shape of the locking wedge is of a wedge shape, the locking connector also has a mounting flange connected with the hub, and the mounting flange is located at one end of the locking wedge with a greater thickness; and
    wherein the mounting flange has an adjusting threaded hole, and the bearing supporting apparatus for the wind turbine generator system further comprises an ejector piece screwed on the adjusting threaded hole; one end of the ejector piece is propped against an end face of the hub.

2. The bearing supporting apparatus for the wind turbine generator system according to claim 1, wherein there is an angle $\beta$ between an outer wall surface and an inner wall surface of the locking wedge; the angle $\beta$ is in a range of 1 degree to 15 degrees.

3. The bearing supporting apparatus for the wind turbine generator system according to claim 2, wherein the angle $\beta$ is 1 degree, 3 degrees, 8 degrees, 11 degrees, or 15 degrees.

4. The bearing supporting apparatus for the wind turbine generator system according to claim 1, wherein the mounting flange has a fixing through hole; the bearing supporting apparatus for the wind turbine generator system further comprises a fastener; the fastener is inserted through the fixing through hole and fixedly connected to the hub.

5. The bearing supporting apparatus for the wind turbine generator system according to claim 1, wherein there is a plurality of the locking connectors distributed on an outer periphery of the main bearing seat.

6. The bearing supporting apparatus for the wind turbine generator system according to claim 1, wherein there is a plurality of the locking connectors evenly distributed on an outer periphery of the main bearing seat.

7. The bearing supporting apparatus for the wind turbine generator system according to claim 1, wherein the bearing supporting apparatus for the wind turbine generator system further comprises a plurality of locking and connecting sets, each locking and connecting set comprises a plurality of the locking connectors which are spaced apart in turn.

8. The bearing supporting apparatus for the wind turbine generator system according to claim 1, wherein a surface of the locking wedge facing the hub has a first protrusion; a surface of the hub which is to be matched with the locking wedge has a second protrusion; the first protrusion is matched with the second protrusion.

9. A method for installing a bearing supporting apparatus for a wind turbine generator system, the wind turbine generator comprising an impeller and a generator, wherein the method comprises the following steps:
    hoisting a hub of the impeller and sleeving the hub on an outer side of a main bearing seat of the generator;
    mounting the locking connector according to claim 1 between the main bearing seat and the hub.

10. The method for installing the bearing supporting apparatus for the wind turbine generator system according to claim 9, further comprising the step of:
    fixedly connecting the locking connector to the hub via a fastener.

11. A wind turbine generator system comprising a bearing supporting apparatus, wherein the bearing supporting apparatus is the bearing supporting apparatus according to claim 1.

* * * * *